(12) United States Patent
Chiang et al.

(10) Patent No.: US 10,466,982 B2
(45) Date of Patent: Nov. 5, 2019

(54) MODEL BUILDING SERVER AND MODEL BUILDING METHOD THEREOF

(71) Applicant: Institute For Information Industry, Taipei (TW)

(72) Inventors: Yi-Ting Chiang, Taipei (TW); Tsung-Ming Tai, Taichung (TW); Bo-Nian Chen, New Taipei (TW)

(73) Assignee: Institute For Information Industry, Taipei (TW)

( * ) Notice: Subject to any disclaimer, the term of this patent is extended or adjusted under 35 U.S.C. 154(b) by 96 days.

(21) Appl. No.: 15/829,981

(22) Filed: Dec. 3, 2017

(65) Prior Publication Data
US 2019/0146759 A1 May 16, 2019

(30) Foreign Application Priority Data
Nov. 15, 2017 (TW) .............................. 106139490 A

(51) Int. Cl.
*G06F 9/44* (2018.01)
*G06F 8/35* (2018.01)
*G06N 20/00* (2019.01)
*G06F 7/483* (2006.01)

(52) U.S. Cl.
CPC ............... *G06F 8/35* (2013.01); *G06N 20/00* (2019.01); *G06F 7/483* (2013.01); *G06F 2207/4835* (2013.01)

(58) Field of Classification Search
CPC .... G06F 8/35; G06F 7/483; G06F 2207/4835; G06F 20/00
USPC .......................................................... 717/104
See application file for complete search history.

(56) References Cited

FOREIGN PATENT DOCUMENTS

CN          104537382 A      4/2015

*Primary Examiner* — Anna C Deng
(74) *Attorney, Agent, or Firm* — Skaar Ulbrich Macari, P.A.

(57) ABSTRACT

A model building server and model building method thereof are provided. The model building server stores a model building program having a configuration combination. The model building server randomly generates a plurality of first configuration combination codes for feature categories, model algorithm categories and hyperparameters to set the configuration combination, and runs the model building program based on a first optimization algorithm to determine a first model. According to at least one determined feature category and at least one determined model algorithm category indicated by the configuration combination code corresponding to the first model, the model building server randomly generates a plurality of second configuration combination codes for features, model algorithms and hyperparameters to set the configuration combination, and runs the model building program based on a second optimization algorithm to determine an optimization model.

16 Claims, 7 Drawing Sheets

MODEL BUILDING SERVER AND MODEL BUILDING METHOD THEREOF

PRIORITY

This application claims priority to Taiwan Patent Application No. 106139490 filed on Nov. 15, 2017, which is hereby incorporated by reference in its entirety.

FIELD

The present invention relates to a model building server and a model building method thereof. Particularly, the model building server of the present invention performs a two-stage configuration coding and optimization procedure to build an optimization model.

BACKGROUND

With rapid development of the science and technology, machine learning and deep learning have become important topics of science and technology studies, and have been widely used in various fields, e.g., face recognition, autonomous-driving, automatic speech translation and so on. In the process of building a desired model through machine learning and deep learning, the developers must set features to be retrieved from raw data and select a model algorithm to be trained manually and by experience before training a model, and adjust all parameters (e.g., basic parameters and hyperparameters) related to the model algorithm during the training.

However, in the current model training process, only the basic parameters (e.g., weights and biases of the convolution layer or the full connected layer) can be automatically adjusted by the machine learning and deep learning, while most of hyperparameters must be set manually and by experience and need be adjusted through repeated attempts. Because there is a large number of optional features and model algorithms and the adjustment of the hyperparameters still need be accomplished manually through repeated attempts, the developers have to consume a lot of time in selecting features that need to be retrieved and model algorithms that need to be trained and adjusting the hyperparameters in order to build an appropriate model. Furthermore, it is difficult to evaluate whether the built model is an optimization model.

Accordingly, a model building mechanism for building an optimization model is needed in related applications such as face recognition, autonomous-driving, automatic speech translation or the like.

SUMMARY

An objective of certain embodiments of the present invention is to provide a model building mechanism which performs a configuration combination coding on selectable feature and model algorithm configurations and adjustable hyperparameter configuration in the model training to generate a plurality of configuration combination codes, performs the model training based on the configuration combination codes and decides an optimization configuration combination code based on an optimization algorithm to build an optimization model. Furthermore, the model building mechanism of the present invention divides the optimization procedure into two stages: the first stage is mainly to select a first-stage optimization model according to the feature categories and the model algorithm categories, and the second stage is to further select a second-stage optimization model according to features in the feature categories and model algorithms in the model algorithm categories corresponding to the first-stage optimization model, and automatically adjust the hyperparameter configuration to build a final model. In this way, the model building mechanism of the present invention can effectively select features to be retrieved and model algorithms to be trained, and automatically adjust the hyperparameters to build an optimization model.

To achieve the aforesaid objective, the disclosure includes a model building server comprising a network interface, a storage and a processor. The storage is configured to store a plurality of raw data, a plurality of output labels and a model building program. The output labels correspond to the raw data. The model building program has a configuration combination, and the configuration combination comprises a feature retrieving configuration, a model algorithm configuration and a model algorithm hyperparameter configuration. A feature configuration range of the feature retrieving configuration comprises a plurality of feature categories, and each of the feature categories comprises a plurality of features. A model algorithm configuration range of the model algorithm configuration comprises a plurality of model algorithm categories, and each of the model algorithm categories comprises at least one model algorithm. A hyperparameter configuration range of the model algorithm hyperparameter configuration comprises a plurality of hyperparameter sets, and each of the hyperparameter sets corresponds to one of the model algorithms and comprises at least one hyperparameter. When the model building program is running, the feature retrieving configuration is configured to enable the model building program to generate a plurality of training data from the plurality of raw data, and the model algorithm configuration and the model algorithm hyperparameter configuration are configured to enable the model building program to perform a training of supervised learning based on the training data and the output labels to build a model. The processor is electrically connected to the network interface and the storage, and is configured to execute the following steps: performing a configuration combination coding based on the feature categories, the model algorithm categories and the hyperparameters to randomly generate a plurality of first configuration combination codes, wherein each of the first configuration combination codes has a plurality of first integer fields and a plurality of first float-point fields, the first integer fields correspond to the feature categories and the model algorithm categories respectively and the first float-point fields correspond to the hyperparameters respectively, an integer value of each of the first integer fields is randomly generated to be 1 or 0, the integer value of the first integer field being 1 represents that the feature category or the model algorithm category corresponding to the first integer field is applied, and the integer value of the first integer field being 0 represents that the feature category or the model algorithm category corresponding to the first integer field is not applied, and a float-point value of each of the first float-point fields is randomly generated and falls within a preset range of the corresponding hyperparameter; generating a plurality of first-stage optimization configuration combination codes from the first configuration combination codes based on a first optimization algorithm; setting the configuration combination of the model building program according to the first-stage optimization configuration combination codes respectively, and running the model building program to build a plurality of first-stage models; deciding a first model from the first-stage models, wherein the first model has a relative maximum accuracy value among the first-stage models, and the first-stage optimization configuration combination code corresponding to the first model indicates at least one selected feature category among the feature categories and at least one selected model algorithm category among the model algorithm categories; performing the configuration combination coding based on a plurality of selected features of the at least one selected feature category, at least one selected model algorithm of the at least one selected model algorithm category, and at least one selected hyperparameter corresponding to the at least one selected model algorithm to randomly generate a plurality of second configuration combination codes, wherein each of the second configuration combination codes has a plurality of second integer fields and at least one second float-point field, the second integer fields correspond to the selected features and the at least one selected model algorithm respectively, the at least one second float-point field corresponds to the at least one selected hyperparameter respectively, the integer value of each of the second integer fields is randomly generated to be 1 or 0, the integer value of the second integer field being 1 represents that the selected feature or the selected model algorithm corresponding to the second integer field is applied, and the integer value of the second integer field being 0 represents that the selected feature or the selected model algorithm corresponding to the second integer field is not applied, and the float-point value of each of the at least one second float-point field is randomly generated and falls within the preset range of the corresponding selected hyperparameter; generating a plurality of second-stage optimization configuration combination codes from the second configuration combination codes based on a second optimization algorithm; setting the configuration combination of the model building program according to the second-stage optimization configuration combination codes respectively, and running the model building program to build a plurality of second-stage models; deciding a second model from the second-stage models, wherein the second model has a relative maximum accuracy value among the second-stage models; and storing the second model into the storage as an optimization model.

The disclosure also includes a model building method for a model building server. The model building server comprises a network interface, a storage and a processor. The storage stores a plurality of raw data, a plurality of output labels and a model building program. The output labels correspond to the raw data. The model building program has a configuration combination, and the configuration combination comprises a feature retrieving configuration, a model algorithm configuration and a model algorithm hyperparameter configuration. A feature configuration range of the feature retrieving configuration comprises a plurality of feature categories, and each of the feature categories comprises a plurality of features. A model algorithm configuration range of the model algorithm configuration comprises a plurality of model algorithm categories, and each of the model algorithm categories comprises at least one model algorithm. A hyperparameter configuration range of the model algorithm hyperparameter configuration comprises a plurality of hyperparameter sets. Each of the hyperparameter sets corresponds to one of the model algorithms and comprises at least one hyperparameter. When the model building program is running, the feature retrieving configuration is configured to enable the model building program to generate a plurality of training data from the raw data. The model algorithm configuration and the model algorithm hyperparameter configuration are configured to enable the model building program to perform a training of supervised learning based on the training data and the output labels to build a model. The processor is electrically connected to the network interface and the storage. The model building method is executed by the processor and comprises the following steps: performing a configuration combination coding based on the feature categories, the model algorithm categories and the hyperparameters to randomly generate a plurality of first configuration combination codes, wherein each of the first configuration combination codes has a plurality of first integer fields and a plurality of first float-point fields, the first integer fields correspond to the feature categories and the model algorithm categories respectively and the first float-point fields correspond to the hyperparameters respectively, an integer value of each of the first integer fields is randomly generated to be 1 or 0, the integer value of the first integer field being 1 represents that the feature category or the model algorithm category corresponding to the first integer field is applied, and the integer value of the first integer field being 0 represents that the feature category or the model algorithm category corresponding to the first integer field is not applied, and a float-point value of each of the first float-point fields is randomly generated and falls within a preset range of the corresponding hyperparameter; generating a plurality of first-stage optimization configuration combination codes from the first configuration combination codes based on a first optimization algorithm; setting the configuration combination of the model building program according to the first-stage optimization configuration combination codes respectively, and running the model building program to build a plurality of first-stage models; deciding a first model from the first-stage models, wherein the first model has a relative maximum accuracy value among the first-stage models, and the first-stage optimization configuration combination code corresponding to the first model indicates at least one selected feature category among the feature categories and at least one selected model algorithm category among the model algorithm categories; performing the configuration combination coding based on a plurality of selected features of the at least one selected feature category, at least one selected model algorithm of the at least one selected model algorithm category, and at least one selected hyperparameter corresponding to the at least one selected model algorithm to randomly generate a plurality of second configuration combination codes, wherein each of the second configuration combination codes has a plurality of second integer fields and at least one second float-point field, the second integer fields correspond to the selected features and the at least one selected model algorithm respectively, the at least one second float-point field corresponds to the at least one selected hyperparameter respectively, the integer value of each of the second integer fields is randomly generated to be 1 or 0, the integer value of the second integer field being 1 represents that the selected feature or the selected model algorithm corresponding to the second integer field is applied, and the integer value of the second integer field being 0 represents that the selected feature or the selected model algorithm corresponding to the second integer field is not applied, and the float-point value of each of the at least one second float-point field is randomly generated and falls within the preset range of the corresponding selected hyperparameter; generating a plurality of second-stage optimization configuration combination codes from the second configuration combination codes based on a second optimization algorithm; setting the configuration combination of the model building program according to the second-stage optimization configuration combination codes respectively, and running the model building program to build a plurality of second-stage models; deciding a second model from the second-stage models, wherein the second model has a relative maximum accuracy value among the second-stage models; and storing the second model into the storage as an optimization model.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
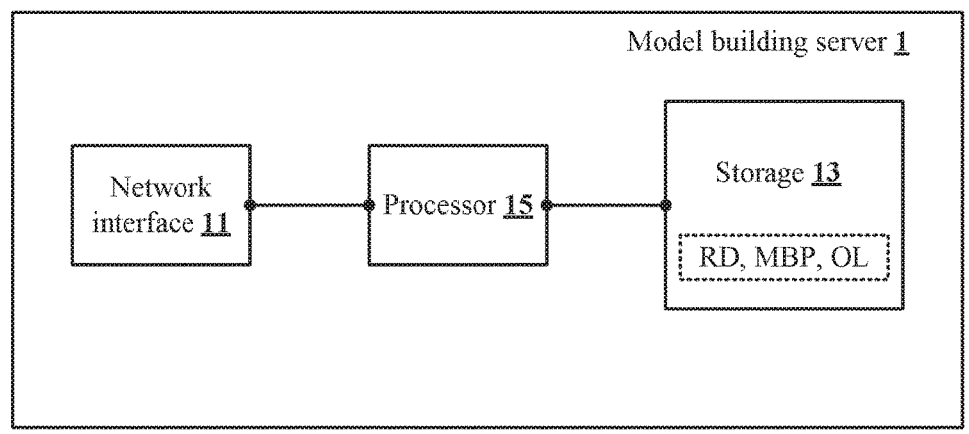
FIG. 1 depicts a schematic view of a model building server 1 according to the present invention.

Please refer to FIG. 1, FIGS. 2A~2B and FIGS. 3A~3B for a first embodiment of the present invention. A schematic view of a model building server 1 according to the present invention is shown in FIG. 1. The model building server 1 comprises a network interface 11, a storage 13 and a processor 15. The processor 15 is electrically connected to the network interface 11 and the storage 13. The storage 13 stores a plurality of raw data RD, a plurality of output labels OL and a model building programs MBP. The output labels OL correspond to the plurality of raw data RD. The raw data RD may be generated by a sensor, a microphone, an image capturing device or the like. The model building program MBP has a configuration combination, which comprises a feature retrieving configuration, a model algorithm configuration and a model algorithm hyperparameter configuration. A feature configuration range of the feature retrieving configuration comprises a plurality of feature categories, and each of the feature categories includes a plurality of features.

For example, the feature categories may include a math feature category, a statistic feature category, an energy feature category and a reduction feature category, but is not limited thereto. The math feature category may include such features as a sine (sin) function, a cosine (cos) function, a tangent (tan) function, an exponential (exp) function and a logarithm (log) function, but is not limited thereto. The statistic feature category may include such features as a maximal value, a minimal value, an average value and a standard deviation, but is not limited thereto. The energy feature category may include such features as a Fourier Transform (FT) and a Discrete Cosine Transform (DCT), but is not limited thereto. The reduction feature category includes such features as a Principal Component Analysis (PCA), a Linear Discriminant Analysis (LDA) and an Autoregressive Model (AR), but is not limited thereto.

A model algorithm configuration range of the model algorithm configuration comprises a plurality of model algorithm categories, and each of the model algorithm categories includes at least one model algorithm. For example, the model algorithm categories may include a Markov model algorithm category, a Bayesian algorithm category, an Instance based algorithm category, a Neural Network algorithm category, a Domain Transform algorithm category, a Fuzzy Logic algorithm category, and a Regression Method algorithm category, but is not limited thereto.

The Markov model algorithm category may include a Hidden Markov Model algorithm and a Conditional Random Field algorithm, but is not limited thereto. The Bayesian algorithm category may include a Naive Bayes algorithm and a Bayesian Network algorithm, but is not limited thereto. The Instance based algorithm category may include a K-nearest neighbors (KNN) algorithm, but is not limited thereto. The Neural Network algorithm may comprise a multilayer Perceptron algorithm, an Artificial Neural Networks (ANN) algorithm, a Convolutional Neural Networks (CNN) algorithm, a Recurrent Neural Networks (RNN) algorithm, but is not limited thereto. The Domain Transform algorithm category may include a Support Vector Machines (SVM) algorithm, but is not limited thereto. The Fuzzy Logic algorithm category may include a Fuzzy Basis Function algorithm and a Fuzzy Inference algorithm, but is not limited thereto. The Regression Method algorithm category may include a Multiple Linear Regression (MLR) algorithm and an Accelerated Higher Order Logistic Regression (ALR) algorithm, but is not limited thereto.

A hyperparameter configuration range of the model algorithm hyperparameter configuration comprises a plurality of hyperparameter sets. Each of the hyperparameter sets corresponds to one of the model algorithms and comprises at least one hyperparameter. For example, hyperparameters of the SVM algorithm include a cost (c) and a gamma (g). It shall be noted that, the scope of the present invention is not limited to the feature categories and the algorithm categories described above, so other feature categories or other algorithm categories may be added by those of ordinary skill in the art based on the above descriptions to achieve the same efficacy. For example, the present invention may further comprise other algorithm categories in other embodiments, including the Expectation-Maximization (EM) algorithm, the Decision Tress algorithm, the Random Forest algorithm and so on.

Figure 2A:
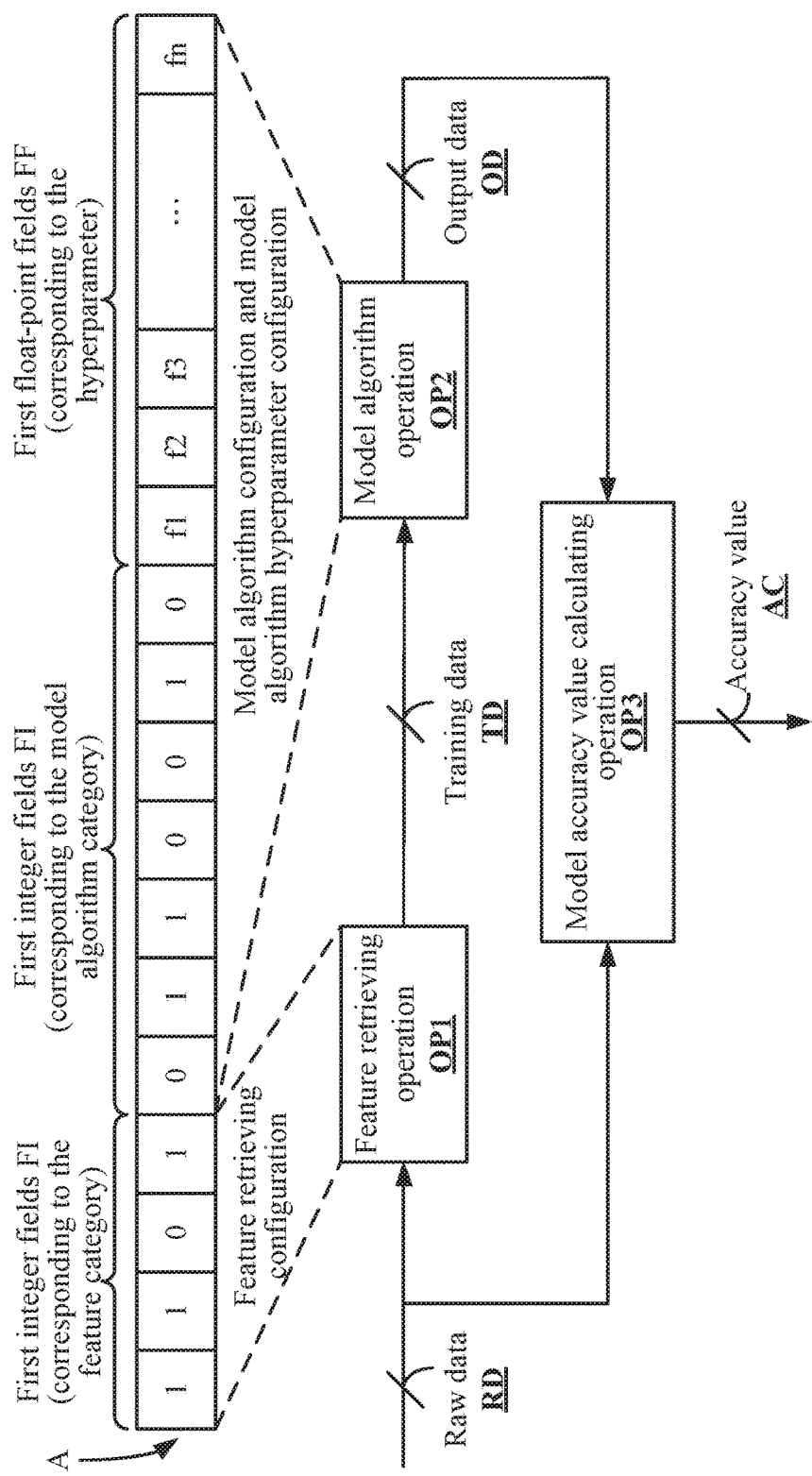
FIGS. 2A~2B depict a flowchart diagram of model training performed by the model building server 1 according to the present invention.
Figure 2B:
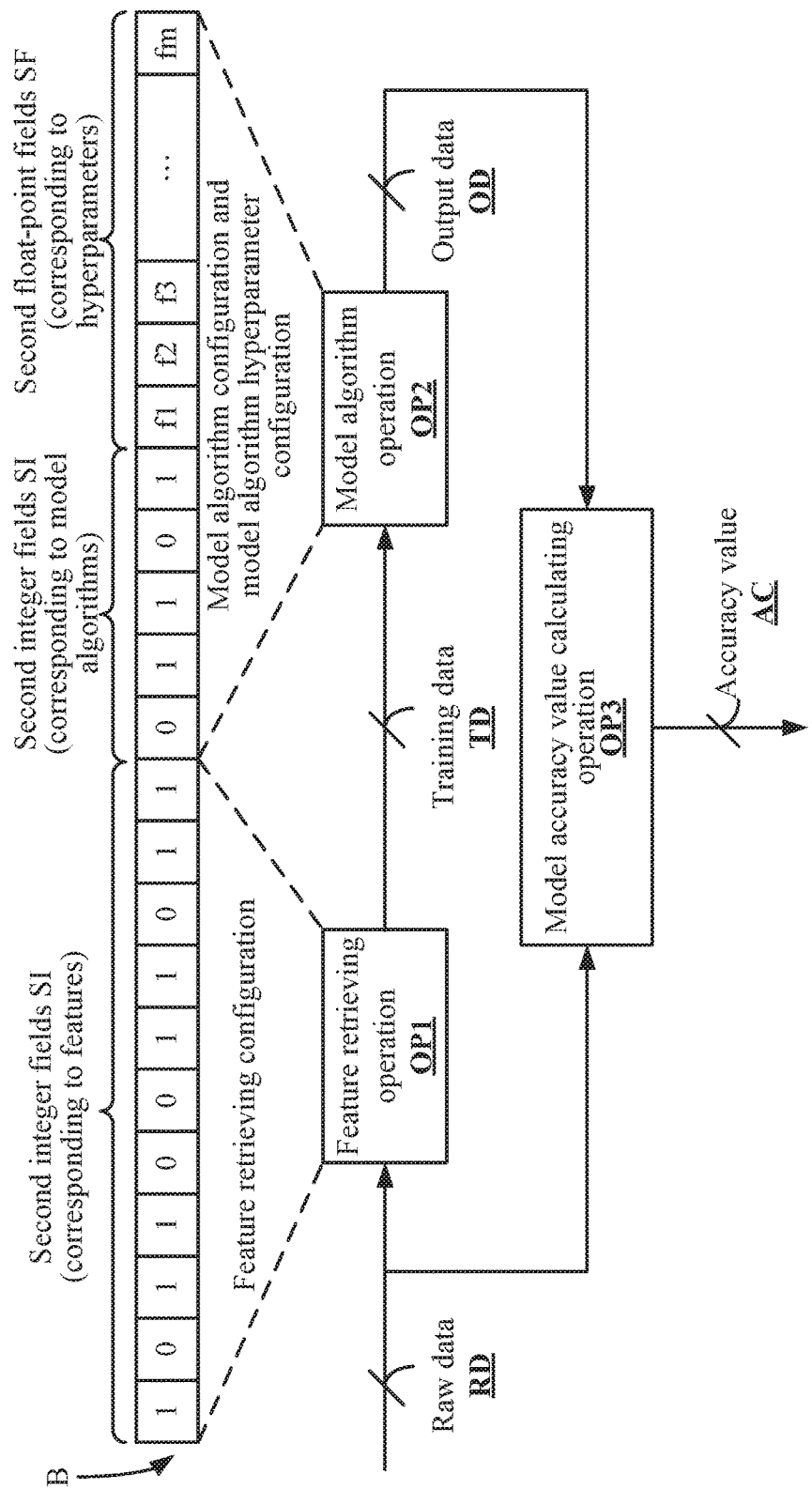

When the model building program MBP is running, the feature retrieving configuration is configured to enable the model building program to retrieve features from the raw data RD to generate a plurality of training data TD. The model algorithm configuration and the model algorithm hyperparameter configuration are configured to enable the model building program MBP to perform a training of supervised learning based on the training data TD and the output labels OL to build a model. In detail, as shown in FIG. 2A, the model building program MBP retrieves features from the raw data RD based on the feature retrieving configuration to generate the training data TD (i.e., a feature retrieving operation OP1), and performs an operation on the training data TD by using the configured model algorithm based on the model algorithm configuration and the model algorithm hyperparameter configuration to generate an output data OD (i.e., a model algorithm operation OP2).

Next, based on a mapping relationship between the raw data RD and the output labels OL, each of the output data OD is labeled by the model building program MBP to perform a training of supervised learning on the configured model algorithm to build a model. Afterwards, the processor 15 may perform an operation on other raw data RD (i.e., testing data) that are not used for the aforesaid training of supervised learning via the built model, compare the raw data RD inputted into the model with the output data OD and determine a percentage in which the output data OD meet the expected outputs of the raw data RD to calculate an accuracy value of this model (i.e., a model accuracy value calculating operation OP3).

In a first stage of the optimization procedure, the processor 15 performs a configuration combination encoding based on the feature categories, the model algorithm categories and the hyperparameters to randomly generate a plurality of first configuration combination codes. Each of the first configuration combination codes has a plurality of first integer fields FI and a plurality of first float-point fields FF. The first integer fields FI correspond to the feature categories and the model algorithm categories respectively and the first float-point fields FF correspond to the hyperparameters respectively. For example, FIG. 2A depicts that a first configuration combination code A comprises four first integer fields FI corresponding to the feature categories, seven first integer fields FI corresponding to the model algorithm categories and n first float-point fields FF corresponding to the hyperparameters, where n is a positive integer, and a value of n corresponds to the number of hyperparameters of all model algorithms in the model algorithm categories.

An integer value of each of the first integer fields FI of the first configuration combination code A is randomly generated to be 1 or 0. The integer value of the first integer field FI being 1 represents that the feature category or the model algorithm category corresponding to the first integer field FI is applied, and the integer value of the first integer field FI being 0 represents that the feature category or the model algorithm category corresponding to the first integer field FI is not applied. A float-point value of each of the first float-point fields FF is randomly generated and falls within a preset range of the corresponding hyperparameter. Taking the SVM algorithm as an example, the preset range of its hyperparameter cost ranges between $2^{-5}$ and $2^{15}$, and the preset range of its hyperparameter gamma ranges between $2^{-15}$ and $2^{3}$. For example, assuming that the first field to the fourth field of the first configuration combination code represent the math feature category, the statistic feature category, the energy feature category and the reduction feature category, respectively, then the first configuration combination code A represents that, when the model building program MBP is running, all features in the math feature category, the statistic feature category and the reduction feature category are used in the feature retrieving configuration to retrieve features from the raw data RD to generate the training data TD.

After these first configuration combination codes are generated, the processor 15 generates a plurality of first-stage optimization configuration combination codes from the first configuration combination codes based on a first optimization algorithm, and sets configuration combinations for the model building program MBP according to the first-stage optimization configuration codes respectively, and runs the model building program MBP to build a plurality of first-stage models. Then, the processor 15 determines a first model from the first-stage models, where the first model has a relative maximum accuracy value among the first-stage models.

The first optimization algorithm may be a genetic algorithm or a particle swarm optimization algorithm. For example, FIGS. 3A~3B both take a binary genetic algorithm as an example for description. The configuration combination of the model building program MBP are adjusted according to the feature categories and the model algorithm categories used in each of the first configuration combination codes, and the processor 15 runs the model building program MBP to perform the training of supervised learning and calculates an accuracy value AC of the model which is built based on each of the first configuration combination codes. Then, the processor 15 may first eliminate first configuration combination codes corresponding to models whose accuracy value AC is poorer. In practical operations, the processor 15 may use a threshold value as an elimination criterion (or a natural selection criterion). For example, those of the first configuration combination codes corresponding to models whose accuracy value AC is less than 50% is eliminated, or only those of the first configuration combination codes corresponding to the models whose accuracy value AC is relative greater are kept (e.g., a half of the first configuration combination codes are kept). After the preliminary filtering of all the first configuration combination codes, the processor 15 performs crossover and mutation operations of the binary genetic algorithm.

Figure 3A:
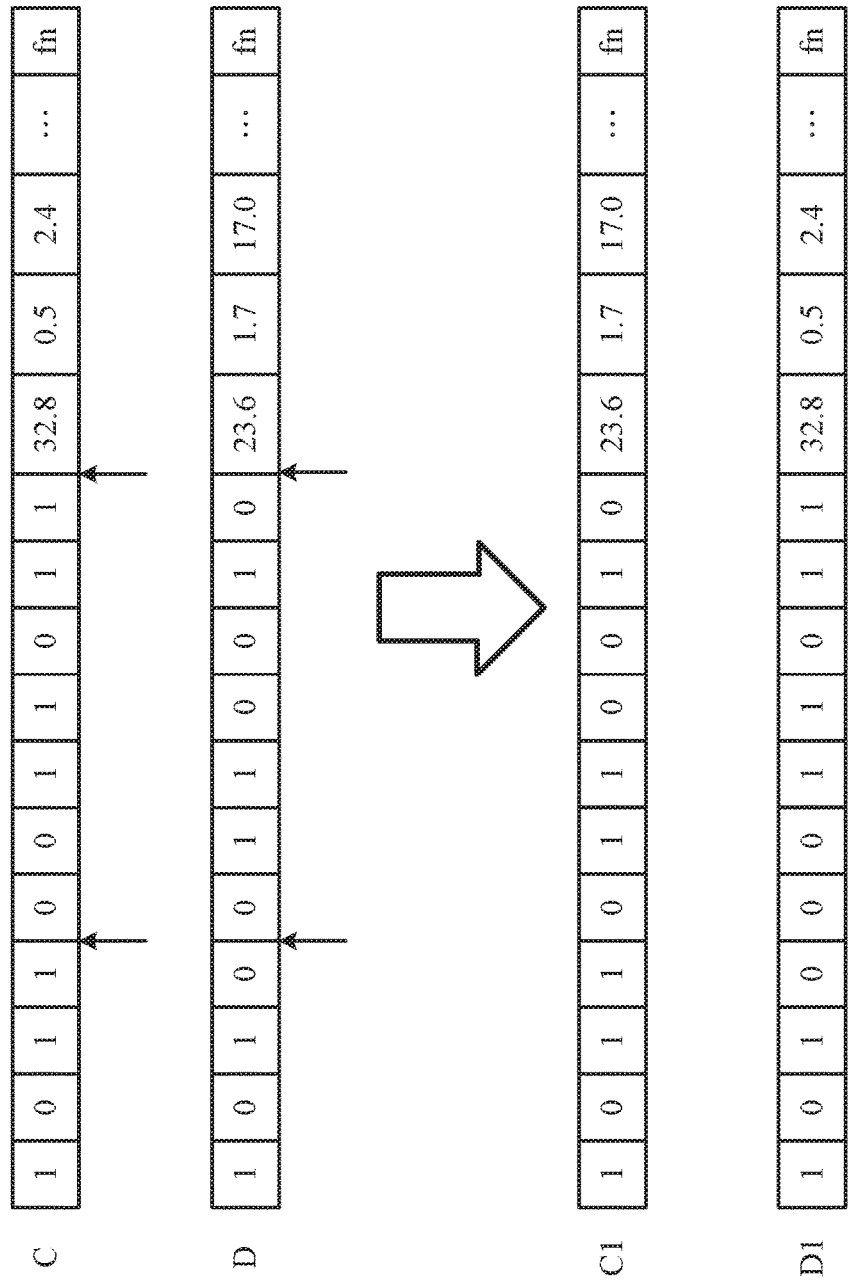
FIGS. 3A~3B depict a schematic view of an optimization algorithm adopted by the present invention.

Referring to FIG. 3A, the first configuration combination code C and the first configuration combination code D are the first configuration combination codes that are randomly generated by the processor 15 and kept after the preliminary filtering. In the crossover operation (the position indicated by the arrow is the crossover point), the processor 15 swaps the first integer fields FI of the first configuration combination code C and the first integer fields FI of the first configuration combination code D, which are located after the crossover point, with each other and swaps the first float-point fields FF of the first configuration combination code C and the first float-point fields FF of the first configuration combination code D, which are located after the crossover point, with each other to generate a first configuration combination code C1 and a first configuration combination code D1. It shall be appreciated that, in this exemplary example, the genetic algorithm is set in such a way that the first integer fields FF and the first float-point fields FF of the first configuration combination codes D1 are crossed over separately; however, in practical operations, the genetic algorithm may also be set in such a way that the first integer fields FI of the feature categories, the first integer fields FI of the model algorithm categories and the first float-point fields FF are crossed over separately. Therefore, the crossover setting of the genetic algorithm is not intended to limit the scope of the present invention.

Figure 3B:
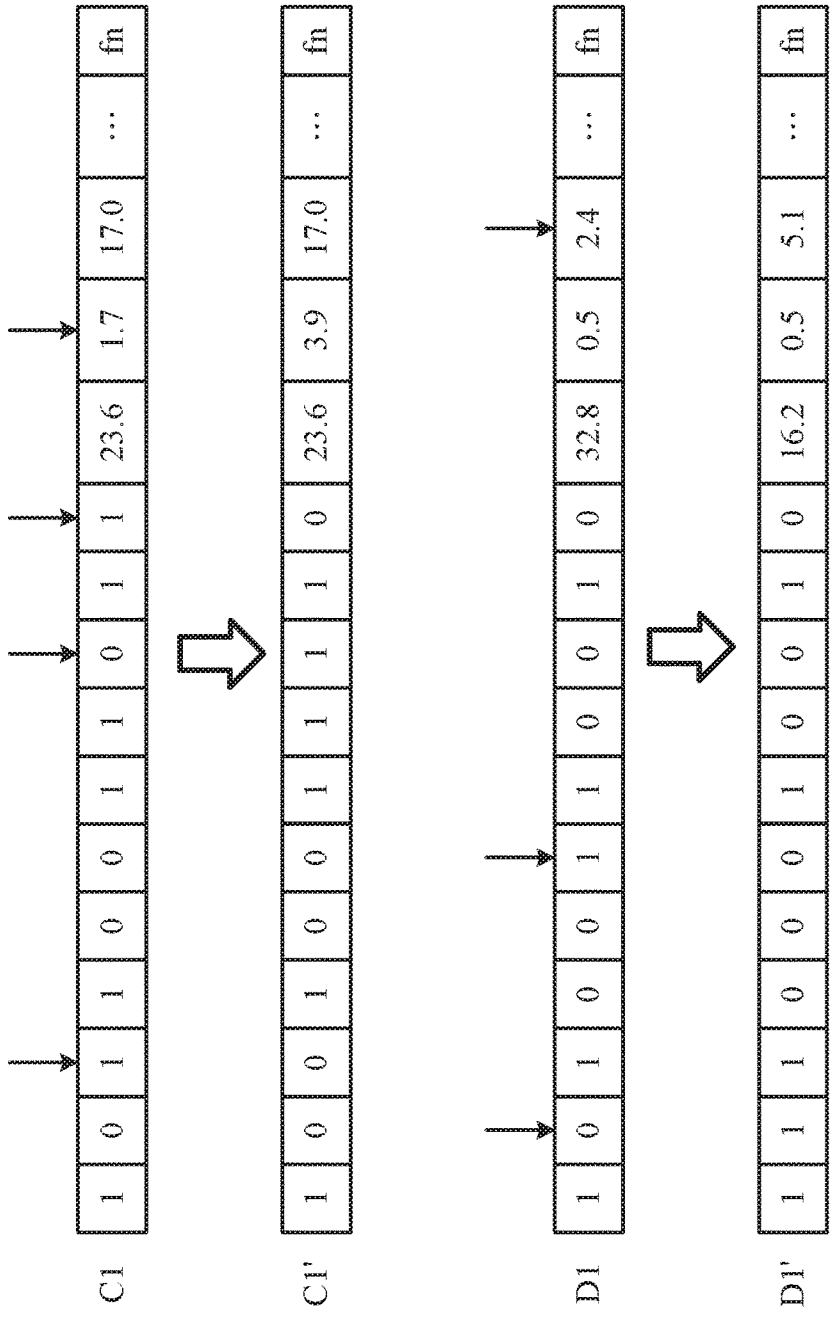

Referring next to FIG. 3B, the processor 15 further performs a mutation operation (a position indicated by the arrow is the mutation point) on the first configuration combination code C1 and the first configuration combination code D1 respectively. In the mutation operation, if the integer value of the first integer field FI at each mutation point is 1, it is changed to 0 and vice versa, and new hyperparameter values are re-generated randomly for the first float-point fields FF at the mutation points. As shown in FIG. 3B, a first configuration combination code C1' is generated from mutation of the first configuration combination code C1, and a first configuration combination code D1' is generated from mutation of the first configuration combination code D1. In this way, the first configuration combination code C1' and the first configuration combination code D1' of the new generation can be generated by the processor 15.

Then, the processor 15 adjusts the configuration combination of the model building program MBP according to the feature categories and the model algorithm categories used in each of the first configuration combination codes of the new generation, and runs the model building program MBP to perform the training of supervised learning to build a model corresponding to each of the first configuration combination codes of the new generation. Afterwards, the processor 15 calculates an accuracy value AC of the model which is built based on each of the first configuration combination codes of the new generation. Similarly, the processor 15 may first eliminate those of the first configuration combination codes of the new generation that correspond to models whose accuracy value AC is poorer, and perform the aforesaid crossover and mutation operations again based on the remaining first configuration combination codes to generate first configuration combination codes of the next generation.

It can be understood by those of ordinary skill in the art that through reproduction of several generations by the genetic algorithm, the first configuration combination codes of the newest generation can be used as the first-stage optimization configuration combination codes, and one of the first-stage models having a relative maximum accuracy value AC among the first-stage models, which are built based on the first-stage optimization configuration combination codes, can be used as a first model. Furthermore, the purpose of mutation is to improve diversity of the first configuration combination codes to increase the probability of building a model having a higher accuracy value AC. However, the result of mutation may be either positive or negative. Therefore, to avoid a disordered condition caused by mutation, the mutation probability is usually set according to an elimination criterion.

It shall be appreciated that, the aforesaid example is described with reference to the genetic algorithm, but as can be understood by those of ordinary skill in the art, the first-stage optimization configuration combination code may also be generated according to other optimization algorithms (e.g., a particle swarm optimization (PSO) algorithm). For example, as can be understood by those of ordinary skill in the art, the particle swarm optimization algorithm is partly similar to the genetic algorithm. The particle swarm optimization algorithm moves (or alters) each of the first configuration combination codes based on the setting of a movement velocity and the particle best and global best positions calculated in each iteration. Therefore, through movements of several iterations in the particle swarm optimization algorithm, the current first configuration combination codes can be used as the first-stage optimization configuration combination code. Because detailed operations of generating the first-stage optimization configuration combination codes according to other optimization algorithms (e.g., according to the particle swarm optimization algorithm) can be understood by those of ordinary skill in the art, they will not be further described herein.

After the first-stage model having the relative maximum accuracy value AC has been selected as the first model, the processor 15 performs a second stage of the optimization procedure according to at least one selected feature category among the feature categories and at least one selected model algorithm category among the model algorithm categories indicated by the first-stage optimization configuration combination code corresponding to the first model. The processor 15 performs a configuration combination encoding based on a plurality of selected features of the at least one selected feature category, at least one selected model algorithm of the at least one selected model algorithm category and at least one selected hyperparameter of the corresponding at least one selected model algorithm to randomly generate a plurality of second configuration combination codes.

Each of the second configuration combination codes has a plurality of second integer fields SI and at least one second float-point field SF. The second integer fields SI correspond to the selected features and the at least one selected model algorithm respectively, and the at least one second float-point field SF corresponds to the at least one selected hyperparameter respectively. For example, the second configuration combination code B depicted in FIG. 2B comprises eleven second integer fields SI corresponding to the selected features, five second integer fields SI corresponding to the selected model algorithms and m second float-point fields SF corresponding to the selected hyperparameters, where m is a positive integer and has a value corresponding to the number of hyperparameters of all the selected model algorithms in the at least one selected model algorithm category.

When the selected feature categories are the statistic feature category and the energy feature category, the first eleven fields among the second integer fields SI of each of the second configuration combination codes correspond to features (i.e., the selected features) in the statistic feature category and in the energy feature category, respectively. When the selected model algorithm categories are the Domain Transform algorithm category and the Fuzzy Logic algorithm category, the twelfth to the sixteenth fields among the second integer fields SI of each of the second configuration combination codes correspond to model algorithms (i.e., the selected model algorithms) in the Domain Transform algorithm category and the Fuzzy Logic algorithm category, respectively, and the second float-point fields SF of each of the second configuration combination codes correspond to hyperparameters (i.e., the selected hyperparameters) of the model algorithms, respectively.

Similarly, the integer value of each of the second integer fields SI of each of the second configuration combination codes B is randomly generated to be 1 or 0. The integer value of the second integer field SI being 1 represents that the selected feature or the selected model algorithm corresponding to the second integer field SI is applied, and the integer value of the second integer field SI being 0 represents that the selected feature or the selected model algorithm corresponding to the second integer field SI is not applied, and the float-point value of each of the at least one second float-point field SI is randomly generated and falls within the preset range of the corresponding selected hyperparameter.

After these second configuration combination codes have been generated, the processor 15 generates a plurality of second-stage optimization configuration combination codes from the second configuration combination codes based on a second optimization algorithm, sets the configuration combinations of the model building program MBP according to the second-stage optimization configuration combination codes respectively, and runs the model building program MBP to build a plurality of second-stage models. Similarly, the processor 15 calculates the accuracy value AC of each of the second-stage models in the process of the training of supervised learning. Then, the processor 15 decides one of the second-stage models having the relative maximum accuracy value as a second model. In other words, the second model has the relative maximum accuracy value AC among the second-stage models. Finally, the processor 15 selects one of the second-stage models having the relative maximum accuracy value as a second model and stores the second model as the optimization model.

Similarly, the second optimization algorithm may be a genetic algorithm, a particle swarm optimization algorithm or other optimization algorithms. Because how the second-stage optimization configuration combination codes are generated from the second-stage configuration combination codes based on the genetic algorithm, the particle swarm optimization algorithm or other optimization algorithms in the second stage can be readily understood by those of ordinary skill in the art in view of the description of generating the first-stage optimization configuration combination codes from among the first configuration combination codes based on the first optimization algorithm in the first stage, it will not be further described herein.

It shall be appreciated that, in the present invention, the end condition of the first optimization algorithm and the second optimization algorithm (e.g., the number of times of reproduction by the genetic algorithm, or the number of iterations of the particle swarm optimization algorithm) may be decided by the user himself through setting an accuracy threshold or a time required to build the optimization model. Therefore, the model building server 1 of the present invention may further decide when (i.e., which generation or which iteration) to take the first configuration combination codes and the second configuration combination codes as the first-stage optimization combination codes and the second-stage optimization configuration combination codes based on the desired accuracy threshold or the desired time to build the optimization model, and build the first model and the second model correspondingly.

In an embodiment, the processor 15 may generate a software development kit (SDK) based on the optimization model for an external device to download. Further in other embodiments, the processor 15 receives the raw data RD and the output labels OL from an external device.

It can be appreciated from the above description that, the model building server 1 of the present invention can effectively and automatically select features to be retrieved and model algorithms to be trained and automatically adjust hyperparameters to build an optimization model through the two-stage optimization procedure. In this way, the model building server 1 of the present invention allows a user to upload a plurality of raw data and a plurality of output labels corresponding thereto, builds an optimization model for the uploaded data and generates a software development kit (SDK) for the user to download it and apply it as desired. Therefore, the user can achieve the desired application by using the model building server 1 of the present invention even though the user has no knowledge of machine learning and data analysis.

For example, when the user is a sports coach, he or she can produce a plurality of raw data by himself or herself for different motions via a motion sensor of a smart wristband, and label these raw data to correspond to the motions so as to generate the output labels corresponding thereto. Then, the sports coach uploads the raw data and the output labels to the model building server 1 so that an SDK is generated by the model building server 1 for the user to download. Accordingly, the sports coach may provide this SDK to trainees to let they install it into their smart wristbands to record the number of times of each motion during exercising in their daily lives. Additionally, as can be understood by those of ordinary skill in the art, the model building server 1 is also applicable to other fields (e.g., face recognition, autonomous-driving, automatic speech translation) to build an optimization model for the desired application field via the model building server 1.

Figure 4A:
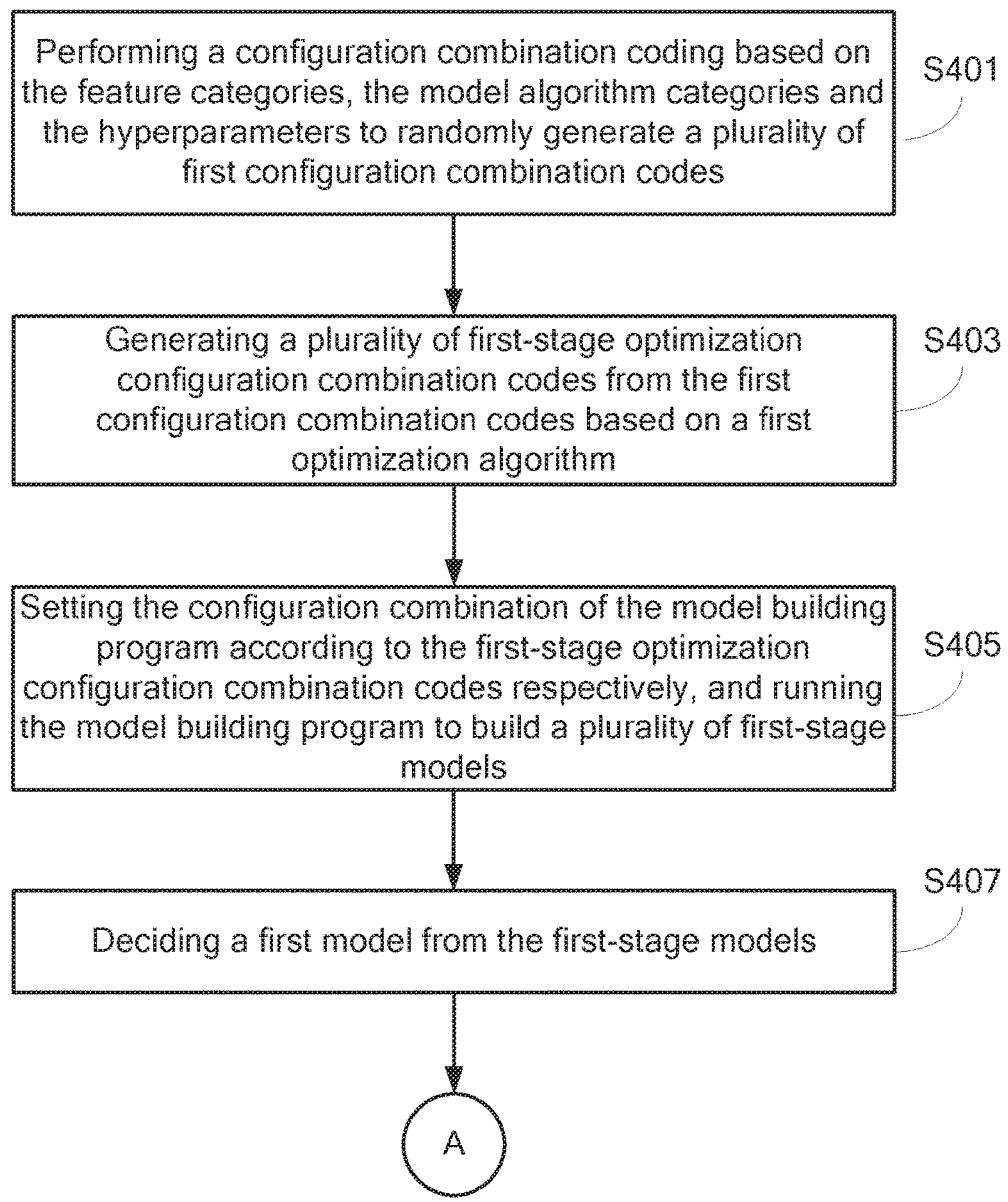
FIGS. 4A~4B depict a flowchart diagram of a model building method according to the present invention.
Figure 4B:
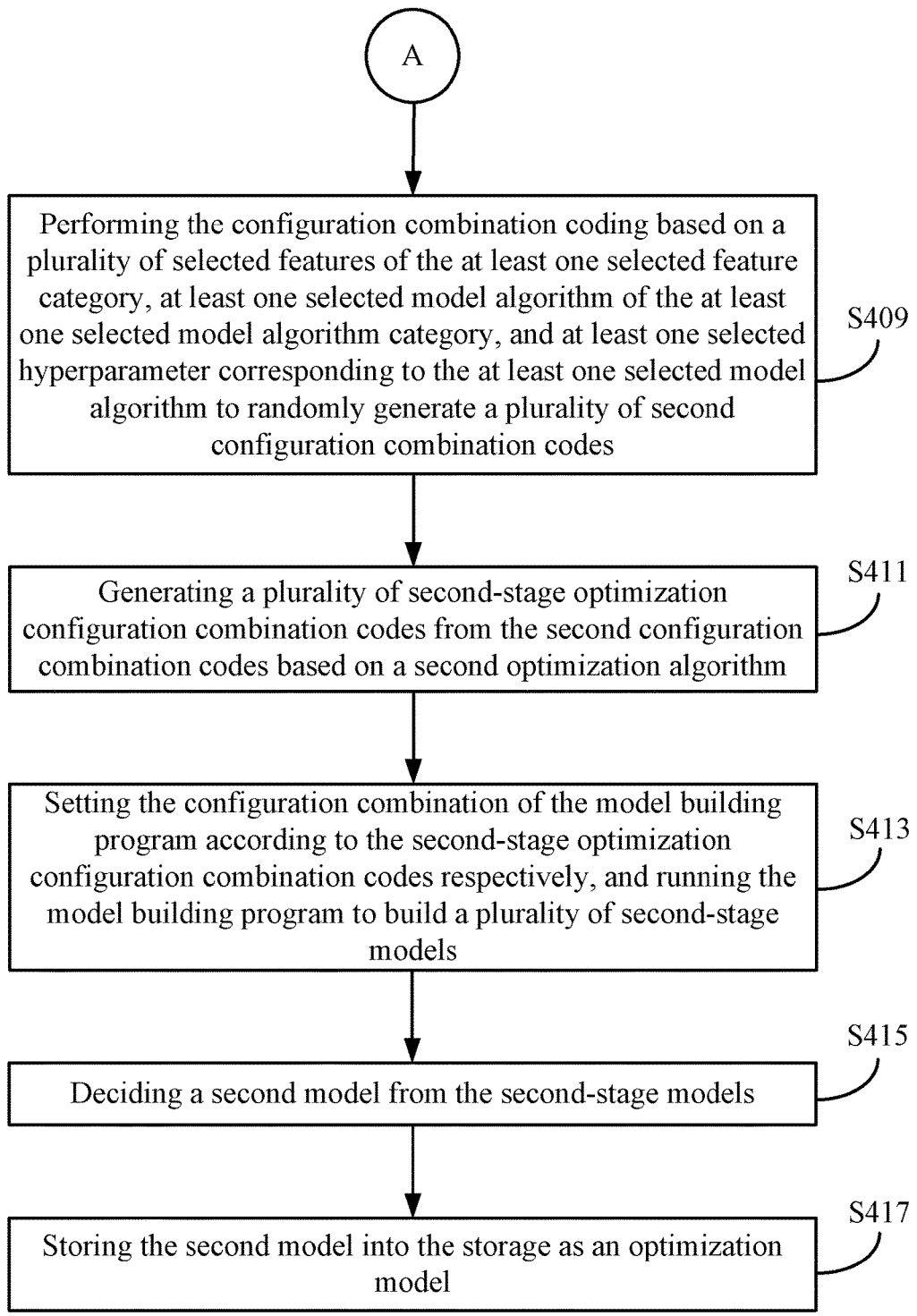

Please refer to FIGS. 4A~4B for a second embodiment of the present invention, which depict a flowchart diagram of a model building method according to the present invention. The model building method is adapted for a model building server (e.g., the model building server 1 of the first embodiment), and comprises a network interface, a storage and a processor. The processor is electrically connected to the network interface and the storage. The storage stores a plurality of raw data, a plurality of output labels and a model building program. The plurality of output labels correspond to the plurality of raw data. The model building program has a configuration combination, which comprises a feature retrieving configuration, a model algorithm configuration and a model algorithm hyperparameter configuration.

A feature configuration range of the feature retrieving configuration comprises a plurality of feature categories, each of which comprises a plurality of features. A model algorithm configuration range of the model algorithm configuration comprises a plurality of model algorithm categories, and each of the model algorithm categories comprises at least one model algorithm. A hyperparameter configuration range of the model algorithm hyperparameter configuration comprises a plurality of hyperparameter sets, and each of the hyperparameter sets corresponds to one of the model algorithms and comprises at least one hyperparameter. When the model building program is running, the feature retrieving configuration is configured to enable the model building program to generate a plurality of training data from the plurality of raw data. The model algorithm configuration and the model algorithm hyperparameter configuration are configured to enable the model building program to perform a training of supervised learning based on the training data and the output labels to build a model.

The model building method is executed by the processor. First in the step S401, a configuration combination coding is performed based on the feature categories, the model algorithm categories and the hyperparameters to randomly generate a plurality of first configuration combination codes. Each of the first configuration combination codes has a plurality of first integer fields and a plurality of first float-point fields. The first integer fields correspond to the feature categories and the model algorithm categories respectively and the first float-point fields correspond to the hyperparameters respectively. An integer value of each of the first integer fields is randomly generated to be 1 or 0. The integer value of the first integer field being 1 represents that the feature category or the model algorithm category corresponding to the first integer field is applied, and the integer value of the first integer field being 0 represents that the feature category or the model algorithm category corresponding to the first integer field is not applied. A float-point value of each of the first float-point fields is randomly generated and falls within a preset range of the corresponding hyperparameter.

Then in the step S403, a plurality of first-stage optimization configuration combination codes are generated from the first configuration combination codes based on a first optimization algorithm. In the step S405, the configuration combination of the model building program is set according to the first-stage optimization configuration combination codes respectively, and the model building program is run to build a plurality of first-stage models. Afterwards, in the step S407, a first model is decided from the first-stage models. The first model decided in the first-stage optimization procedure of the present invention has a relative maximum accuracy value among the first-stage models. The first-stage optimization configuration combination code corresponding to the first model indicates at least one selected feature category among the feature categories and at least one selected model algorithm category among the model algorithm categories.

As described in the first embodiment, the model building server retrieves corresponding features from the raw data RD according to all features included in the applied feature category to generate training data TD, and generates output data OD based on the model algorithm configuration and the model algorithm hyperparameter configuration. Then, a comparison is made between the raw data RD and the output data OD based on a mapping relationship between the raw data RD and the output labels and a percentage in which the output data OD meet the expected outputs of the raw data RD is determined to calculate the accuracy value of the model which is built based on each of the first configuration combination codes.

Next, a second-stage optimization procedure of the present invention is executed. In the step S409, the configuration combination coding is performed based on a plurality of selected features of the at least one selected feature category, at least one selected model algorithm of the at least one selected model algorithm category, and at least one selected hyperparameter corresponding to the at least one selected model algorithm to randomly generate a plurality of second configuration combination codes. Each of the second configuration combination codes has a plurality of second integer fields and at least one second float-point field. The second integer fields correspond to the selected features and the at least one selected model algorithm respectively, and the at least one second float-point field corresponds to the at least one selected hyperparameter respectively. The integer value of each of the second integer fields is randomly generated to be 1 or 0. The integer value of the second integer field being 1 represents that the selected feature or the selected model algorithm corresponding to the second integer field is applied, and the integer value of the second integer field being 0 represents that the selected feature or the selected model algorithm corresponding to the second integer field is not applied. The float-point value of each of the at least one second float-point field is randomly generated and falls within the preset range of the corresponding selected hyperparameter.

In the step S411, a plurality of second-stage optimization configuration combination codes are generated from the second configuration combination codes based on a second optimization algorithm. Then in the step S413, the configuration combination of the model building program is set according to the second-stage optimization configuration combination codes respectively, and the model building program is run to build a plurality of second-stage models. Afterwards, in the step S415, a second model is decided from the second-stage models. As described above, the model building server calculates an accuracy value of each of the second-stage models, and selects one of the second-stage models that has the relative maximum accuracy value as the second model. That is, the second model has the relative maximum accuracy value among the second-stage models. Finally in the step S417, the second model is stored as an optimization model into the storage.

In other embodiments, the first optimization algorithm is one of a genetic algorithm and a particle swarm optimization algorithm, and the second optimization algorithm is one of the genetic algorithm and the particle swarm optimization algorithm. In other embodiments, the processor calculates an accuracy value of the model generated by performing the training of supervised learning according to a mapping relationship between the raw data and the output labels. In other embodiments, the processor further receives the raw data and the output labels from an external device via the network interface. In an embodiment, the processor generates, based on the optimization model, a software development kit (SDK) for an external device to download.

In other embodiments, the feature categories include a math feature category, a statistic feature category, an energy feature category and a reduction feature category, and the model algorithm categories include a Markov model algorithm category, a Bayesian algorithm category, an Instance based algorithm category, a Neural Network algorithm category, a Domain Transform algorithm category, a Fuzzy Logic algorithm category, and a Regression Method algorithm category.

In addition to the aforesaid steps, the model building method of this embodiment can also execute all the operations described in the previous embodiment and have all the corresponding functions. How this embodiment executes these operations and has these functions can be readily understood by those of ordinary skill in the art, so it will not be further described herein.

According to the above descriptions, the model building mechanism of the present invention performs a configuration combination coding on selectable configurations in the model training to generate a plurality of configuration combination codes, performs model training based on the configuration combination codes and selects an optimization configuration combination code having the relative maximum accuracy value based on an optimization algorithm to build an optimization model. Furthermore, the model building mechanism of the present invention divides the optimization procedure into two stages: the first stage is mainly to select a first-stage optimization model according to the feature categories and the model algorithm categories, and the second stage is to further select a second-stage optimization model according to features in the feature categories and model algorithms in the model algorithm categories corresponding to the first-stage optimization model, and automatically adjust the hyperparameter configuration to build a final model. In this way, the model building mechanism of the present invention can effectively select features to be retrieved and model algorithms to be trained, and automatically adjust the hyperparameters to build an optimization model.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A model building server, comprising:
a network interface;
a storage, being configured to store a plurality of raw data, a plurality of output labels and a model building program, the output labels corresponding to the raw data, the model building program having a configuration combination, the configuration combination comprising a feature retrieving configuration, a model algorithm configuration and a model algorithm hyperparameter configuration, a feature configuration range of the feature retrieving configuration comprising a plurality of feature categories, each of the feature categories comprising a plurality of features, a model algorithm configuration range of the model algorithm configuration comprising a plurality of model algorithm categories, each of the model algorithm categories comprising at least one model algorithm, a hyperparameter configuration range of the model algorithm hyperparameter configuration comprising a plurality of hyperparameter sets, each of the hyperparameter sets corresponding to one of the model algorithms and comprising at least one hyperparameter, wherein when the model building program is running, the feature retrieving configuration is configured to enable the model building program to generate a plurality of training data from the raw data, and the model algorithm configuration and the model algorithm hyperparameter configuration are configured to enable the model building program to perform a training of supervised learning based on the training data and the output labels to build a model; and a processor electrically connected to the network interface and the storage, being configured to execute the following steps:

performing a configuration combination coding based on the feature categories, the model algorithm categories and the hyperparameters to randomly generate a plurality of first configuration combination codes, wherein each of the first configuration combination codes has a plurality of first integer fields and a plurality of first float-point fields, the first integer fields correspond to the feature categories and the model algorithm categories respectively and the first float-point fields correspond to the hyperparameters respectively, an integer value of each of the first integer fields is randomly generated to be 1 or 0, the integer value of the first integer field being 1 represents that the feature category or the model algorithm category corresponding to the first integer field is applied, and the integer value of the first integer field being 0 represents that the feature category or the model algorithm category corresponding to the first integer field is not applied, and a float-point value of each of the first float-point fields is randomly generated and falls within a preset range of the corresponding hyperparameter;

generating a plurality of first-stage optimization configuration combination codes from the first configuration combination codes based on a first optimization algorithm;

setting the configuration combination of the model building program according to the first-stage optimization configuration combination codes respectively, and running the model building program to build a plurality of first-stage models;

deciding a first model from the first-stage models, wherein the first model has a relative maximum accuracy value among the first-stage models, and the first-stage optimization configuration combination code corresponding to the first model indicates at least one selected feature category among the feature categories and at least one selected model algorithm category among the model algorithm categories;

performing the configuration combination coding based on a plurality of selected features of the at least one selected feature category, at least one selected model algorithm of the at least one selected model algorithm category, and at least one selected hyperparameter corresponding to the at least one selected model algorithm to randomly generate a plurality of second configuration combination codes, wherein each of the second configuration combination codes has a plurality of second integer fields and at least one second float-point field, the second integer fields correspond to the selected features and the at least one selected model algorithm respectively, the at least one second float-point field corresponds to the at least one selected hyperparameter respectively, the integer value of each of the second integer fields is randomly generated to be 1 or 0, the integer value of the second integer field being 1 represents that the selected feature or the selected model algorithm corresponding to the second integer field is applied, and the integer value of the second integer field being 0 represents that the selected feature or the selected model algorithm corresponding to the second integer field is not applied, and the float-point value of each of the at least one second float-point field is randomly generated and falls within the preset range of the corresponding selected hyperparameter;

generating a plurality of second-stage optimization configuration combination codes from the second configuration combination codes based on a second optimization algorithm;

setting the configuration combination of the model building program according to the second-stage optimization configuration combination codes respectively, and running the model building program to build a plurality of second-stage models;

deciding a second model from the second-stage models, wherein the second model has a relative maximum accuracy value among the second-stage models; and storing the second model into the storage as an optimization model.

2. The model building server of claim 1, wherein the first optimization algorithm is one of a genetic algorithm and a particle swarm optimization algorithm.

3. The model building server of claim 1, wherein the second optimization algorithm is one of a genetic algorithm and a particle swarm optimization algorithm.

4. The model building server of claim 1, wherein the processor calculates an accuracy value of the model which is built by performing the training of supervised learning according to a mapping relationship between the raw data and the output labels.

5. The model building server of claim 4, wherein the processor further receives the raw data and the output labels from an external device via the network interface.

6. The model building server of claim 1, wherein based on the optimization model, the processor further generates a software development kit (SDK) for an external device to download.

7. The model building server of claim 1, wherein the feature categories include a math feature category, a statistic feature category, an energy feature category and a reduction feature category.

8. The model building server of claim 1, wherein the model algorithm categories include a Markov model algorithm category, a Bayesian algorithm category, an Instance based algorithm category, a Neural Network algorithm category, a Domain Transform algorithm category, a Fuzzy Logic algorithm category, and a Regression Method algorithm category.

9. A model building method for a model building server, the model building server comprising a network interface, a storage and a processor, the storage storing a plurality of raw data, a plurality of output labels and a model building program, the output labels corresponding to the raw data, the model building program having a configuration combination, the configuration combination comprising a feature retrieving configuration, a model algorithm configuration and a model algorithm hyperparameter configuration, a feature configuration range of the feature retrieving configuration comprising a plurality of feature categories, each of the feature categories comprising a plurality of features, a model algorithm configuration range of the model algorithm configuration comprising a plurality of model algorithm categories, each of the model algorithm categories comprising at least one model algorithm, a hyperparameter configuration range of the model algorithm hyperparameter configuration comprising a plurality of hyperparameter sets, each of the hyperparameter sets corresponding to one of the model algorithms and comprising at least one hyperparameter, the feature retrieving configuration being configured to enable the model building program to generate a plurality of training data from the raw data and the model algorithm configuration and the model algorithm hyperparameter configuration being configured to enable the model building program to perform a training of supervised learning based on the training data and the output labels to build a model when the model building program is running, the processor being electrically connected to the network interface and the storage, the model building method being executed by the processor and comprising the following steps:

performing a configuration combination coding based on the feature categories, the model algorithm categories and the hyperparameters to randomly generate a plurality of first configuration combination codes, wherein each of the first configuration combination codes has a plurality of first integer fields and a plurality of first float-point fields, the first integer fields correspond to the feature categories and the model algorithm categories respectively and the first float-point fields correspond to the hyperparameters respectively, an integer value of each of the first integer fields is randomly generated to be 1 or 0, the integer value of the first integer field being 1 represents that the feature category or the model algorithm category corresponding to the first integer field is applied, and the integer value of the first integer field being 0 represents that the feature category or the model algorithm category corresponding to the first integer field is not applied, and a float-point value of each of the first float-point fields is randomly generated and falls within a preset range of the corresponding hyperparameter;

generating a plurality of first-stage optimization configuration combination codes from the first configuration combination codes based on a first optimization algorithm;

setting the configuration combination of the model building program according to the first-stage optimization configuration combination codes respectively, and running the model building program to build a plurality of first-stage models;

deciding a first model from the first-stage models, wherein the first model has a relative maximum accuracy value among the first-stage models, and the first-stage optimization configuration combination code corresponding to the first model indicates at least one selected feature category among the feature categories and at least one selected model algorithm category among the model algorithm categories;

performing the configuration combination coding based on a plurality of selected features of the at least one selected feature category, at least one selected model algorithm of the at least one selected model algorithm category, and at least one selected hyperparameter corresponding to the at least one selected model algorithm to randomly generate a plurality of second configuration combination codes, wherein each of the second configuration combination codes has a plurality of second integer fields and at least one second float-point field, the second integer fields correspond to the selected features and the at least one selected model algorithm respectively, the at least one second float-point field corresponds to the at least one selected hyperparameter respectively, the integer value of each of the second integer fields is randomly generated to be 1 or 0, the integer value of the second integer field being 1 represents that the selected feature or the selected model algorithm corresponding to the second integer field is applied, and the integer value of the second integer field being 0 represents that the selected feature or the selected model algorithm corresponding to the second integer field is not applied, and the float-point value of each of the at least one second float-point field is randomly generated and falls within the preset range of the corresponding selected hyperparameter;

generating a plurality of second-stage optimization configuration combination codes from the second configuration combination codes based on a second optimization algorithm;

setting the configuration combination of the model building program according to the second-stage optimization configuration combination codes respectively, and running the model building program to build a plurality of second-stage models;

deciding a second model from the second-stage models, wherein the second model has a relative maximum accuracy value among the second-stage models; and storing the second model into the storage as an optimization model.

10. The model building method of claim 9, wherein the first optimization algorithm is one of a genetic algorithm and a particle swarm optimization algorithm.

11. The model building method of claim 9, wherein the second optimization algorithm is one of a genetic algorithm and a particle swarm optimization algorithm.

12. The model building method of claim 9, wherein the processor calculates an accuracy value of the model which is built by performing the training of supervised learning according to a mapping relationship between the raw data and the output labels.

13. The model building method of claim 12, wherein the processor further receives the raw data and the output labels from an external device via the network interface.

14. The model building method of claim 9, wherein based on the optimization model, the processor further generates a software development kit (SDK) for an external device to download.

15. The model building method of claim 9, wherein the feature categories include a math feature category, a statistic feature category, an energy feature category and a reduction feature category.

16. The model building method of claim 9, wherein the model algorithm categories include a Markov model algorithm category, a Bayesian algorithm category, an Instance based algorithm category, a Neural Network algorithm category, a Domain Transform algorithm category, a Fuzzy Logic algorithm category, and a Regression Method algorithm category.

* * * * *